US009067583B2

(12) United States Patent
Taguchi

(10) Patent No.: US 9,067,583 B2
(45) Date of Patent: Jun. 30, 2015

(54) VEHICLE TRAVEL CONTROL SYSTEM

(75) Inventor: Koji Taguchi, Isehara (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 963 days.

(21) Appl. No.: 12/937,929

(22) PCT Filed: Apr. 14, 2009

(86) PCT No.: PCT/IB2009/005221
§ 371 (c)(1),
(2), (4) Date: Oct. 14, 2010

(87) PCT Pub. No.: WO2009/127933
PCT Pub. Date: Oct. 22, 2009

(65) Prior Publication Data
US 2011/0046835 A1 Feb. 24, 2011

(30) Foreign Application Priority Data

Apr. 14, 2008 (JP) ................................. 2008-104805

(51) Int. Cl.
G01S 13/88 (2006.01)
B60W 20/00 (2006.01)
(Continued)

(52) U.S. Cl.
CPC ............... B60W 20/00 (2013.01); B60W 10/06 (2013.01); B60W 10/08 (2013.01); G08G 1/096827 (2013.01); B60W 2550/143 (2013.01); B60W 2550/402 (2013.01); Y02T 10/6286 (2013.01)

(58) Field of Classification Search
USPC ......... 701/22, 70, 20, 117, 119, 26, 532–533, 701/79, 514, 300, 435, 519; 180/65.21, 180/65.1, 65.2, 168; 709/223–224; 340/464, 467; 903/902; 474/4
See application file for complete search history.

(56) References Cited

U.S. PATENT DOCUMENTS 5,832,400 A * 11/1998 Takahashi et al. ............... 701/53
6,314,347 B1 * 11/2001 Kuroda et al. .................. 701/22
(Continued)

FOREIGN PATENT DOCUMENTS

EP 1 256 476 11/2002
EP 1 842 758 10/2007
(Continued)

OTHER PUBLICATIONS

Online incremental and heuristic path planning for Autonomous Ground Vehicle; Francis, S.L.X.; Anavatti, S.G.; Garratt, M. IECON 2011—37th Annual Conference on IEEE Industrial Electronics Society; Digital Object Identifier:0.1109/IECON.2011.6119317; Pub. Year: 2011, pp. 233-239.*

(Continued)

Primary Examiner — Cuong H Nguyen
(74) Attorney, Agent, or Firm — Oblon, McClelland, Maier & Neustadt, L.L.P.

(57) ABSTRACT

An ECU that integrally controls a vehicle travel control system includes an initial travel plan producing section which produces an initial travel plan including a decelerating interval in which an engine of a vehicle is stopped to decelerate the vehicle, a travel plan reconfiguring section which reconfigures the initial travel plan produced by the initial travel plan reconfiguring section, and a travel control section which controls travel of the vehicle based on a travel plan. When a non-stop state of the engine occurs while the vehicle is traveling, the travel plan reconfiguring section reconfigures the initial travel plan so that target deceleration in the decelerating interval in the initial travel plan is reset to new target deceleration that is larger deceleration.

20 Claims, 12 Drawing Sheets

(51) Int. Cl.
*B60W 10/06* (2006.01)
*B60W 10/08* (2006.01)
*G08G 1/0968* (2006.01)

(56) References Cited

U.S. PATENT DOCUMENTS

| | | | |
|---|---|---|---|
| 6,351,698 B1* | 2/2002 | Kubota et al. | 701/51 |
| 6,401,012 B1* | 6/2002 | Aoki et al. | 701/1 |
| 6,728,623 B2* | 4/2004 | Takenaga et al. | 701/96 |
| 6,941,216 B2* | 9/2005 | Isogai et al. | 701/96 |
| 7,190,260 B2* | 3/2007 | Rast | 340/479 |
| 7,706,950 B2* | 4/2010 | Hino et al. | 701/51 |
| 8,050,863 B2* | 11/2011 | Trepagnier et al. | 701/514 |
| 8,140,203 B2* | 3/2012 | Noffsinger et al. | 701/20 |
| 8,251,864 B2* | 8/2012 | Tabata et al. | 477/3 |
| 2003/0195691 A1* | 10/2003 | Konishi et al. | 701/93 |
| 2003/0217880 A1* | 11/2003 | Isogai et al. | 180/170 |
| 2004/0066330 A1* | 4/2004 | Knockeart et al. | 342/357.07 |
| 2004/0088392 A1* | 5/2004 | Barrett et al. | 709/223 |
| 2004/0104842 A1* | 6/2004 | Drury et al. | 342/357.13 |
| 2006/0220826 A1* | 10/2006 | Rast | 340/479 |
| 2007/0118266 A1* | 5/2007 | Hino et al. | 701/51 |
| 2007/0219681 A1* | 9/2007 | Kumar et al. | 701/19 |
| 2007/0219720 A1* | 9/2007 | Trepagnier et al. | 701/300 |
| 2008/0021628 A1* | 1/2008 | Tryon | 701/99 |
| 2008/0305923 A1* | 12/2008 | Tabata et al. | 477/3 |
| 2009/0254233 A1* | 10/2009 | Noffsinger et al. | 701/20 |
| 2011/0046835 A1* | 2/2011 | Taguchi | 701/22 |
| 2011/0224892 A1* | 9/2011 | Speiser | 701/118 |
| 2012/0022750 A1* | 1/2012 | Matsuda | 701/51 |

FOREIGN PATENT DOCUMENTS

| | | |
|---|---|---|
| GB | 2 399 442 | 9/2004 |
| JP | 2000 333305 | 11/2000 |
| JP | 2002-67159 | * 3/2002 |
| JP | 2002-108684 | * 4/2002 |
| JP | 2004 239091 | 8/2004 |
| JP | 2005-335726 | * 11/2005 |
| JP | 2007-151497 | * 6/2007 |
| JP | 2007 187090 | 7/2007 |
| JP | 2010-163663 | * 7/2010 |

OTHER PUBLICATIONS

Floating Car Data Based Taxi Operation Characteristics Analysis in Beijing; Weng Jian-cheng et al.; Computer Science and Information Engineering, 2009 WRI World Congress on; vol. 5; Computing & Processing (Hardware/Software) Digital Object Identifier: 10.1109/CSIE.2009.815; Pub Year: 2009, pp. 508-512.*

Replanning of Multiple Autonomous Vehicles in Material Handling; Paul, G.; Liu, D.K.; Robotics, Automation and Mechatronics, 2006 IEEE Conference on; Computing & Processing (Hardware/Software); Robotics & Control Systems; Signal Processing & Analysis; Digital Object Identifier: 10.1109/RAMECH.2006.252729; Pub Year: 2006, pp. 1-6.*

Research of Urban Bus Stop Planning Based on Optimization Theory; Li-qun Liu; Yan Zhang; Measuring Technology and Mechatronics Automation, 2009. ICMTMA '09. International Conference on; vol. 3; Components, Circuits, Devices & Systems; Power, Energy, & Industry Applications; Robotics & Control Systems; Pub. Year: 2009, pp. 551-554.*

CMAC neural network controller for fuel-injection systems; Shiraishi, Hitoshi; Ipri, Susan L.; Cho, D.-I.D.; Control Systems Technology, IEEE Transactions on; vol. 3, Issue: 1; DOI: 10.1109/87.370707; Publication Year: 1995, pp. 32-38.*

Automotive engine speed control: A robust nonlinear control framework; Puleston, P.F.; Spurgeon, S.; Monsees, G. Control Theory and Applications, IEE Proceedings—vol. 148, Issue: 1; DOI: 10.1049/ip-cta:20010234; Publication Year: 2001, pp. 81-87.*

Adaptive critic learning techniques for automotive engine control; Javaherian, H.; Derong Liu; Yi Zhang; Kovalenko, O. American Control Conference, 2004. Proceedings of the 2004; vol. 5; Publication Year: 2004, pp. 4066-4071 vol. 5.*

Adaptive compensation of fuel dynamics in an SI engine using a switching EGO sensor; Moraal, P.E.; Decision and Control, 1995., Proceedings of the 34th IEEE Conference on; vol. 1; DOI: 10.1109/CDC.1995.478988; Publication Year: 1995, pp. 661-666 vol. 1.*

Traffic state estimation based on data fusion techniques; Cipriani, E.; Gori, S.; Mannini, L.; Intelligent Transportation Systems (ITSC), 2012 15th International IEEE Conference on; DOI: 10.1109/ITSC.2012.6338694; Publication Year: 2012, pp. 1477-1482.*

City traffic prediction based on real-time traffic information for Intelligent Transport Systems; Zilu Liang; Wakahara, Y. ITS Telecommunications (ITST), 2013 13th International Conference on; DOI: 10.1109/ITST.2013.6685576 Publication Year: 2013, pp. 378-383.*

Acoustic Travel-Time Estimation by Fast Correlation Combined with Up-Sampling; Hua Yan; Ying Xu; Kexin Cui; Lijun Liu; Shaobo Xu; Intelligent Networks and Intelligent Systems, 2008. ICINIS '08. First International Conference on; DOI: 10.1109/ICINIS.2008.83; Publication Year: 2008, pp. 629-632.*

An abstract for "Map Matching Algorithm Based on Mobile Phone Location"; Wang, J.; Wang, D.H.; Chen, S.; Intelligent Computation Technology and Automation (ICICTA), 2011 International Conference on; vol. 1; DOI: 10.1109/ICICTA.2011.176; Publication Year: 2011, pp. 676-679.*

International Search Report issued Dec. 18, 2009 in PCT/IB09/005221filed Apr. 14, 2009.

* cited by examiner

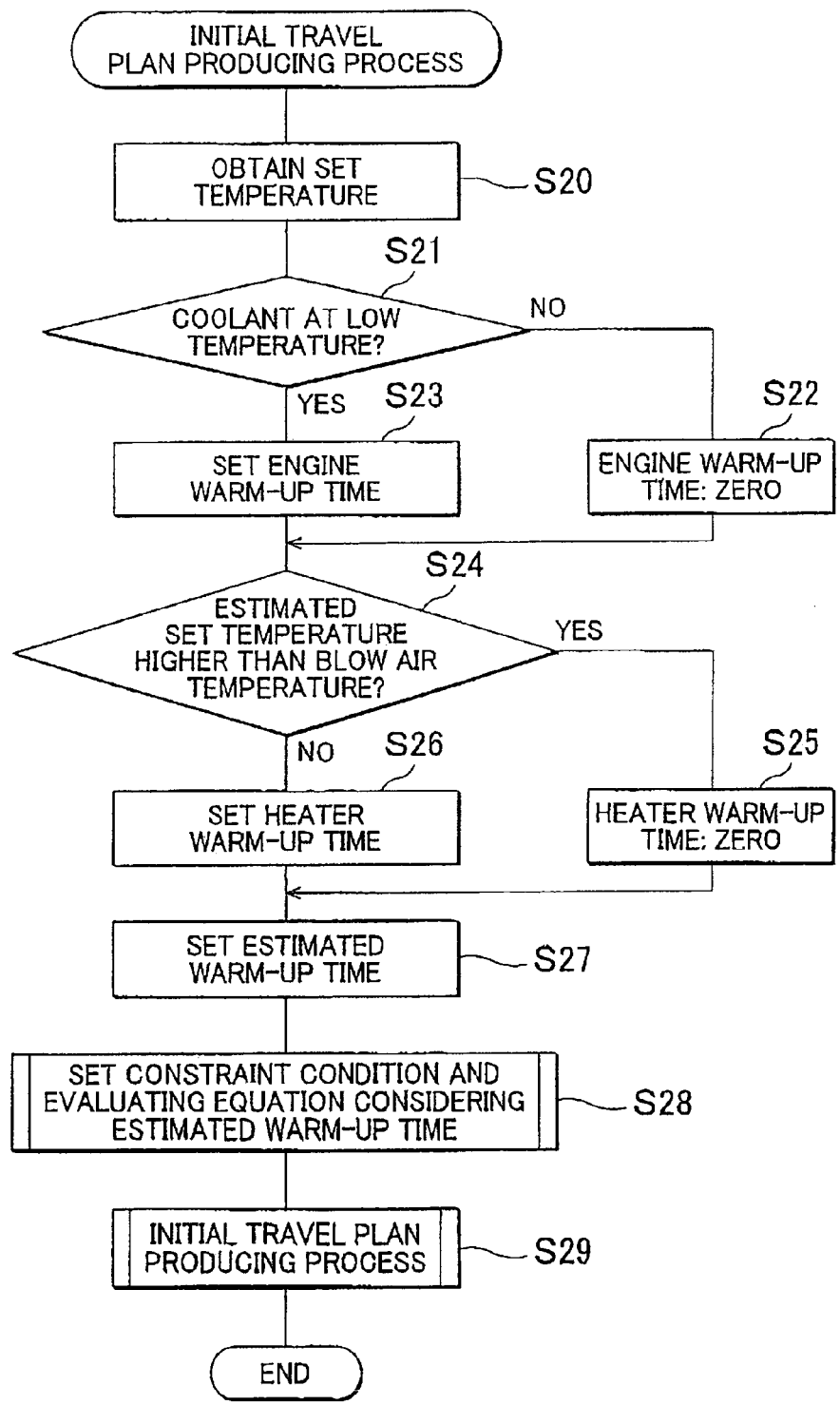

VEHICLE TRAVEL CONTROL SYSTEM

BACKGROUND OF THE INVENTION

1. Field of the Invention

The present invention relates to a vehicle travel control system which controls travel of a vehicle based on a travel plan.

2. Description of the Related Art

Technology to realize travel of a vehicle with low fuel consumption is disposed in Japanese Patent Application Publication No. 2007-187090 (JP-A-2007-187090). The vehicle travel control system is installed in a hybrid vehicle that an engine and a motor are drive sources. The system makes speed retaining control that a travel speed of the vehicle is retained at a target cruise speed. The vehicle travel control system sets an upper limit speed that is higher than the target cruise speed and a lower limit speed that is lower than the target cruise speed. The system makes the vehicle accelerate to the upper limit speed with the engine as the drive source, makes the vehicle travel with the engine being stopped when the speed reaches the upper limit speed, and starts the engine to make the vehicle accelerate when the speed reaches the lower limit speed.

However, there are cases that the non-stop state of the engine such as warm-up of the engine, battery, and heater occurs while the vehicle is traveling. In such a case, there is a possibility that the vehicle travel control system cannot realize the travel with low fuel consumption as planned and that the fuel efficiency deteriorates.

SUMMARY OF THE INVENTION

The present invention provides a vehicle travel control system which can prevent deterioration in fuel efficiency even when a non-stop state of the internal combustion engine occurs in a case that travel of a vehicle is controlled based on a travel plan in which the vehicle is decelerated by stopping the internal combustion engine.

A vehicle travel control system in accordance with a first aspect of the present invention relates to a vehicle travel control system which controls travel of a vehicle based on a travel plan. The vehicle travel control system has an initial travel plan producing section which produces an initial travel plan including a decelerating interval in which an internal combustion engine of the vehicle is stopped to decelerate the vehicle, and a first replanning section which replans the initial travel plan such that target deceleration in the decelerating interval is set larger than that in the initial travel plan when a non-stop state of the internal combustion engine occurs while the vehicle is traveling.

In accordance with the vehicle travel control system, the initial travel plan producing section produces the initial travel plan including the decelerating interval in which the internal combustion engine is stopped to decelerate the vehicle. This allows improvement in fuel efficiency. When the non-stop state of the internal combustion engine occurs while the vehicle is traveling, the first replanning section replans the initial travel plan such that the target deceleration in the decelerating interval is set larger than that in the initial travel plan. Therefore, the average speed in the decelerating interval is improved, thereby shortening time required for deceleration. This allows prevention of a decline in heat efficiency of the internal combustion engine due to continued deceleration for a long time period. Furthermore, in the case that the travel time or the average speed is fixed in the travel plan, surplus time provided as a result of the time reduction in the decelerating interval can be assigned to the other intervals. Therefore, low fuel consumption can be realized for the whole travel plan. As described above, the first aspect of the present invention allows prevention of deterioration in fuel efficiency even when the non-stop state of the internal combustion engine occurs in a case that travel of the vehicle is controlled based on a travel plan in which the vehicle is decelerated by stopping the internal combustion engine.

The first replanning section may replan the initial travel plan such that target acceleration in an accelerating interval that follows the decelerating interval is set larger than that in the initial travel plan when the non-stop state of the internal combustion engine occurs while the vehicle is traveling. When the non-stop state of the internal combustion engine occurs, the first replanning section replans the initial travel plan such that the target acceleration in the accelerating interval that follows the decelerating interval is set larger. Therefore, the average speed in the accelerating interval is increased, thereby reducing the travel time in the accelerating interval. Accordingly, in the case that the travel time or the average speed is fixed in the travel plan, surplus time provided as a result of the time reduction in the decelerating interval can be assigned to the other intervals. Therefore, low fuel consumption can be realized for the whole travel plan.

A driving system of the vehicle is a hybrid system in which the vehicle is driven by the internal combustion engine and a motor having a battery as a power source. The first replanning section may replan the initial travel plan with new target deceleration in the decelerating interval which is a value that a product of maximum regenerative braking deceleration at which deceleration produces maximum regeneration and ideal heat efficiency of the internal combustion engine is divided by heat efficiency of the internal combustion engine and charge-discharge efficiency of the battery at the present time.

The value that the product of the maximum regenerative braking deceleration and the ideal heat efficiency of the internal combustion engine is divided by the heat efficiency and the charge-discharge efficiency of the battery at the present time is set as the target deceleration in the decelerating interval in which the internal combustion engine is brought into the non-stop state. Therefore, the deceleration in the decelerating interval is increased. In other words, the reduced amount of the heat efficiency of the internal combustion engine corresponding to the deceleration is converted into large braking force, and thus the average speed in the decelerating interval is improved. Accordingly, the travel time in the decelerating interval can be reduced. This allows further prevention of deterioration in fuel efficiency.

The first replanning section may replan the initial travel plan with new target acceleration which is a value that acceleration corresponding to an output limit of the battery is added to the target acceleration in the accelerating interval. When the deceleration in the decelerating interval is set larger as described above, a regeneration amount that is fed back to the battery increases. Thus, the battery can easily be fully charged. Therefore, the value that the acceleration corresponding to the output limit of the battery is added to the target acceleration produced by the initial travel plan producing section is set as the target acceleration in the accelerating interval that follows the decelerating interval in which the internal combustion engine is brought into the non-stop state. This allows prevention of a situation that regeneration is not made since the battery is fully charged. Accordingly, the feedback of the regenerative electricity to the battery is effectively made, thereby allowing further improvement in fuel efficiency.

The initial travel plan producing section may estimate an estimated non-stop interval in which the internal combustion engine is brought into the non-stop state and produce the initial travel plan with use of a heat efficiency preferential evaluation equation for a case that the internal combustion engine is in the non-stop state. The vehicle travel control system produces the initial travel plan based on the estimation of the estimated non-stop interval in which the internal combustion engine is brought into the non-stop state. Thus, the initial travel plan can be a general optimum plan that the initial travel plan is optimized as a whole.

The vehicle travel control system in accordance with the aspect may include a provisional traveling time computing section which computes a provisional traveling time that a specified time is added to a traveling time for each interval of the initial travel plan; a provisional travel plan producing section which produces a provisional travel plan by optimization process with a constraint condition being the provisional traveling time; a provisional fuel consumption computing section which computes fuel consumption for each of the intervals in the provisional travel plan; an expected fuel efficiency improvement computing section which computes an expected fuel efficiency improvement of the provisional travel plan with respect to the initial travel plan based on the fuel consumption for each of the intervals in the provisional travel plan and fuel consumption for each of the intervals in the initial travel plan; a surplus traveling time computing section which subtracts a traveling time for each of the intervals in a travel plan replanned by the first replanning section from the traveling time for each of the intervals in the initial travel plan to compute a surplus traveling time for each of the intervals; and a second replanning section which replans the travel plan by the optimization process with a constraint condition being a traveling time that the surplus traveling time is added to the traveling time for the interval that the expected fuel efficiency improvement is the largest.

In the vehicle travel control system, the provisional traveling time for each of the intervals in the initial travel plan is computed, the provisional travel plan in which the provisional traveling time is the constraint condition is produced, the provisional fuel consumption for each of the intervals in the provisional travel plan is computed, and the expected fuel efficiency improvement of the provisional travel plan with respect to the initial travel plan is computed. When the first replanning section has replanned the initial travel plan, the optimization process is executed with the constraint condition being the traveling time that the traveling time for the interval that the expected fuel efficiency is the largest and the surplus traveling time of the concerned interval in the replanned travel plan are added together to reproduce the travel plan. As described above, when the engine non-stop state occurs while traveling, the second replanning section assigns the surplus travel time for the interval reconfigured by the first replanning section to the other intervals and thus reproduces the travel plan. Therefore, low fuel consumption can be realized for the whole travel plan. Furthermore, the travel plan can be reproduced quickly and easily.

The second replanning section may replan the initial travel plan in response to a cause of the non-stop state of the internal combustion engine. The vehicle travel control system can replan the initial travel plan in response to a cause of the non-stop state of the internal combustion engine and thus can appropriately reduce fuel consumption.

A second aspect of the present invention relates to a vehicle travel control system based on a travel plan. The vehicle travel control system includes an initial travel plan producing section which estimates fuel consumption of the vehicle and produces an initial travel plan in consideration of a fuel consumption characteristic; an actual fuel consumption computing section which computes an actual fuel consumption of the vehicle which travels based on the initial travel plan; and a travel plan reconfiguring section which reconfigures a travel plan so that an expected fuel consumption becomes less than that in the initial travel plan when the actual fuel consumption exceeds the expected fuel consumption of the initial travel plan.

A third aspect of the present invention relates to a travel control method to control travel of a vehicle based on a travel plan. The travel control method includes a step for producing an initial travel plan including a decelerating interval in which an internal combustion engine of the vehicle is stopped the vehicle; and a step for replanning the initial travel plan so that target deceleration in the decelerating interval is set larger than the initial travel plan when a non-stop state of the internal combustion engine occurs while the vehicle is traveling.

The present invention allows prevention of deterioration in fuel efficiency even when a non-stop state of the internal combustion engine occurs in a case that travel of a vehicle is controlled based on a travel plan in which the vehicle is decelerated by stopping the internal combustion engine.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a flowchart for demonstrating operation of initial travel plan production process by the ECU;

DETAILED DESCRIPTION OF EMBODIMENTS

An embodiment of a vehicle travel control system in accordance with the present invention will hereinafter be described in detail with reference to the drawings. In this embodiment, description will be made on the vehicle travel control system installed in a hybrid type vehicle that is capable of autopilot operation with an engine and a motor as drive sources. The vehicle travel control system in accordance with this embodiment produces a travel plan by optimization process with a constraint condition and an evaluating function and controls travel of the vehicle based on the travel plan. In this embodiment, description will be made on a case that speed patterns represented by acceleration, deceleration, constant speed travel, and so forth are produced as the travel plan. However, the system may produce the travel plan which is represented by other parameters. Like numerals and symbols are used to represent like or corresponding elements in all the figures.

Figure 1:
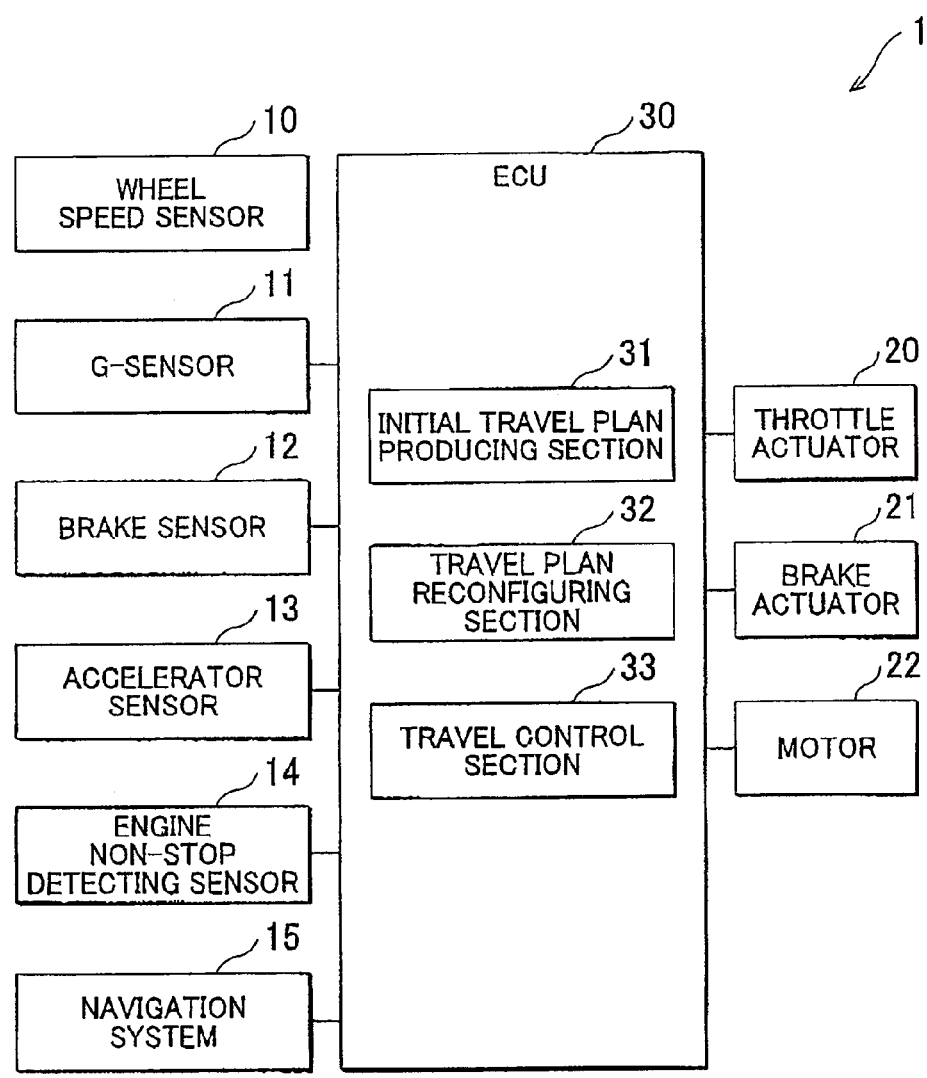
FIG. 1 is a diagram showing a construction of a vehicle travel control system in accordance with an embodiment.

FIG. 1 is a diagram showing a construction of the vehicle travel control system in accordance with the embodiment. As shown in FIG. 1, a vehicle travel control system 1 of this embodiment includes a wheel speed sensor 10, a G-sensor 11, a brake sensor 12, an accelerator sensor 13, an engine non-stop detection sensor 14, a navigation system 15, a throttle actuator 20, a brake actuator 21, a motor 22, and an ECU (Electronic Control Unit) 30.

The wheel speed sensor 10 is provided for each of four wheels of the vehicle and detects the rotational speed of the wheel (the number of pulses corresponding to the wheel rotation). The wheel speed sensor 10 detects the pulse number of the wheel rotation per specified time and sends the detected pulse number of the wheel rotation to the ECU 30 as a wheel speed signal. The ECU 30 computes the wheel speed from the rotational speed of each wheel and computes the traveling speed of the vehicle from the wheel speed of each wheel.

The G-sensor 11 detects the lateral acceleration and the longitudinal acceleration acting on a subject vehicle. The G-sensor 11 detects the accelerations acting on the subject vehicle and sends the accelerations to the ECU 30 as a G-signal. The G-sensor 11 includes a lateral G-sensor and a longitudinal G-sensor corresponding to the accelerations to be detected.

The brake sensor 12 detects the brake operation amount. The brake sensor 12 detects the brake operation amount and sends the brake operation amount to the ECU 30 as a brake signal.

The accelerator sensor 13 detects the accelerator operation amount. The accelerator sensor 13 detects the accelerator operation amount and sends the operation amount to the ECU 30 as an accelerator signal.

The engine non-stop detection sensor 14 detects that the engine, which is one of the drive sources of the vehicle, has been brought into the non-stop state while the vehicle is traveling. The engine non-stop state is a state that the engine cannot be stopped while the vehicle is traveling such as warm-up of the engine, a heater, and a battery. Therefore, the engine non-stop detection sensor 14 is constructed with a hybrid system for drive control between the engine and the motor and with various kinds of sensors. When the engine non-stop detection sensor 14 detects the engine non-stop state, the sensor 14 sends the engine non-stop state to the ECU 30.

The navigation system 15 includes map information, a GPS (Global Positioning System) antenna, a processor, and so forth and obtains road information such as a position of the subject vehicle and road inclination. The navigation system 15 receives GPS signals from GPS satellites with the GPS antenna. The navigation system 15 demodulates the GPS signals by the processor and computes the position of the subject vehicle and so forth based on the demodulated position data of each of the GPS satellites. Meanwhile, the road inclination information is included in the map information that is stored in the navigation system 15 in addition to general map information. The navigation system 15 sends the positional information of the subject vehicle and the map information to the ECU 30.

The throttle actuator 20 adjusts opening of a throttle valve in the engine, which is one of the drive sources of the vehicle. When the throttle actuator 20 receives an engine control signal from the ECU 30, the throttle actuator 20 is actuated in response to the engine control signal and adjusts the throttle valve opening. When the throttle valve opening is largely adjusted by the throttle actuator 20, the vehicle is accelerated.

The brake actuator 21 adjusts brake hydraulic pressure of a wheel cylinder of each wheel. When the brake actuator 21 receives a brake control signal from the ECU 30, the brake actuator 21 is actuated in response to the brake control signal and adjusts the brake hydraulic pressure of the wheel cylinder. When the brake hydraulic pressure is largely adjusted by the brake actuator 21, the vehicle is decelerated.

The motor 22 is an electric motor which is one of the drive sources of the vehicle and operates by the battery (not shown) as a power source. The motor 22 also has a function as a generator and converts rotational energy (kinetic energy) into electric energy to regenerate electric power. When the motor 22 receives a motor control signal, the motor 22 rotates in response to the motor control signal and generates driving force. When the motor 22 receives a regeneration control signal, the motor 22 regenerates electric power in response to the regeneration control signal and charges the battery with the electric power.

The ECU 30 is constructed with a CPU, a ROM, a RAM, and so forth and is an electronic control unit that integrally controls the vehicle travel control system 1. The ECU 30 receives signals from the sensors 10 through 14 and the navigation system 15 at certain intervals and produces an optimal travel plan of the vehicle. The ECU 30 controls the throttle actuator 20, the brake actuator 21, the motor 22, and so forth, thereby controlling travel of the vehicle based on the travel plan. Therefore, the ECU 30 functions as an initial travel plan producing section 31, a travel plan reconfiguring section 32, and a travel control section 33.

The initial travel plan producing section 31 sets up a travel plan by splitting a travel distance into a plurality of intervals and produces an initial travel plan including a decelerating interval in which the engine of the vehicle is stopped to decelerate the vehicle. Particularly, the initial travel plan producing section 31 produces the initial travel plan by optimization process with a constraint condition that must be absolutely followed in the travel of the vehicle and an evaluating function for evaluating a condition that is important for the travel of the vehicle. The optimization process may be performed by any method, and may be performed by, for example, one of the methods described in Japanese Patent Application No. 2007-285451, Japanese Patent Application No. 2007-285458, Japanese Patent Application No. 2007-285461, Japanese Patent Application No. 2007-285462, and so forth.

In other words, for example, as described in Japanese Patent Application No. 2007-285451, in the optimization process, convergence calculation is performed based on the constraint condition that includes at least a condition of lane borderlines, then convergence calculation is performed by the evaluating function that includes at least an evaluation condition for the variance of the speed while retaining the constraint condition, and thereby the travel plan of the travel track with the optimum evaluation is produced.

For example, as described in Japanese Patent Application No. 2007-285458, in the optimization process, convergence calculation is performed based on the constraint condition that includes at least a condition of lane borderlines, then convergence calculation is performed by the evaluating function that includes at least an evaluation condition for the total heat release by brake deceleration while retaining the constraint condition, and thereby the travel plan of the travel track with the optimum evaluation is produced.

Furthermore, for example, as described in Japanese Patent Application No. 2007-285461, in the optimization process, convergence calculation is performed based on the constraint condition that includes at least a condition of lane borderlines, then convergence calculation is performed by the evaluating function that includes at least an evaluation condition for the balance of electric power in the case that the balance of electric power in the hybrid system (electric power used for the electric motor output that is stored by regeneration of the motor) is positive, while retaining the constraint condition, and thereby the travel plan of the travel track with the optimum evaluation is produced.

For example, as described in Japanese Patent Application No. 2007-285462, in the optimization process, convergence calculation is performed based on the constraint condition that includes at least a condition of lane borderlines, then convergence calculation is performed by the evaluating function that includes at least an evaluation condition for the utilization efficiency of the engine output heat efficiency during acceleration while retaining the constraint condition, and thereby the travel plan of the travel track with the optimum evaluation is produced.

The travel plan reconfiguring section 32 reconfigures the initial travel plan produced by the initial travel plan producing section 31 when the non-stop state of the engine occurs while the vehicle is traveling. In other words, the travel plan reconfiguring section 32 increases the target deceleration in the decelerating interval in which the engine of the vehicle is stopped to decelerate the vehicle, and increases the target acceleration in the accelerating interval that follows the decelerating interval, thereby reconfiguring the initial travel plan.

The travel control section 33 controls travel of the vehicle based on the initial travel plan produced by the initial travel plan producing section 31 or the travel plan reconfigured from the initial travel plan by the travel plan reconfiguring section 32. The travel control section 33 controls the throttle actuator 20, the brake actuator 21, and the motor 22, thereby controlling travel of the vehicle.

Figure 2:
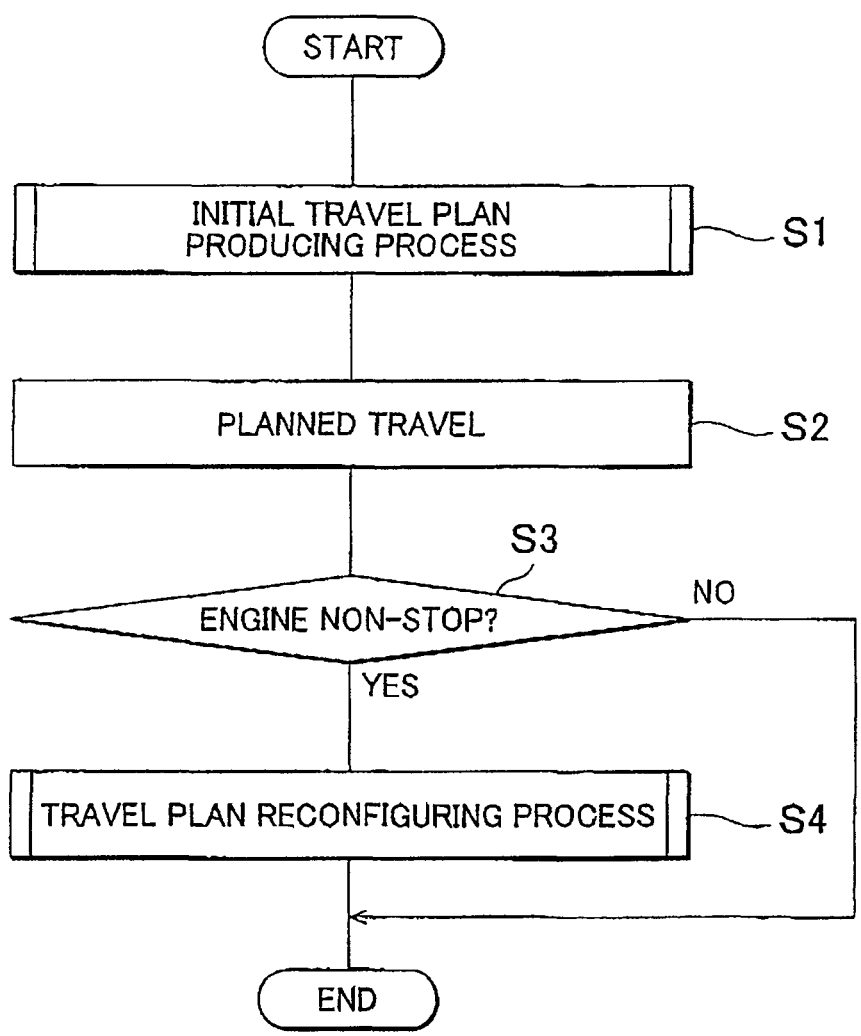
FIG. 2 is a flowchart for demonstrating processing operation by an ECU.

Next, processing operation of the vehicle travel control system 1 in accordance with this embodiment will be described with reference to FIG. 2. FIG. 2 is a flowchart for demonstrating the processing operation by the ECU.

The ECU 30 first executes the optimization process described above and produces an optimum initial travel plan in consideration of a fuel consumption characteristic (step S1). The engine of the vehicle is stopped, and thus the vehicle is decelerated in the decelerating interval in the initial travel plan. In other words, in the decelerating interval, the vehicle is in a gliding state, which is a decelerating state only with rolling resistance, to be decelerated. In step S2, the ECU 30 controls travel of the vehicle based on the initial travel plan.

Then, the ECU 30 determines whether or not the engine is in the non-stop state (step S2). If it is determined that the engine is not in the non-stop state (step S3: NO), the ECU 30 continues the control of the vehicle travel based on the initial travel plan.

On the other hand, if it is determined that the engine is in the non-stop state (step S3: YES), the ECU 30 executes travel plan reconfiguring process to reconfigure the initial travel plan produced in step S1 (step S4). The ECU 30 controls travel of the vehicle based on the travel plan reconfigured in step S4.

Figure 3:
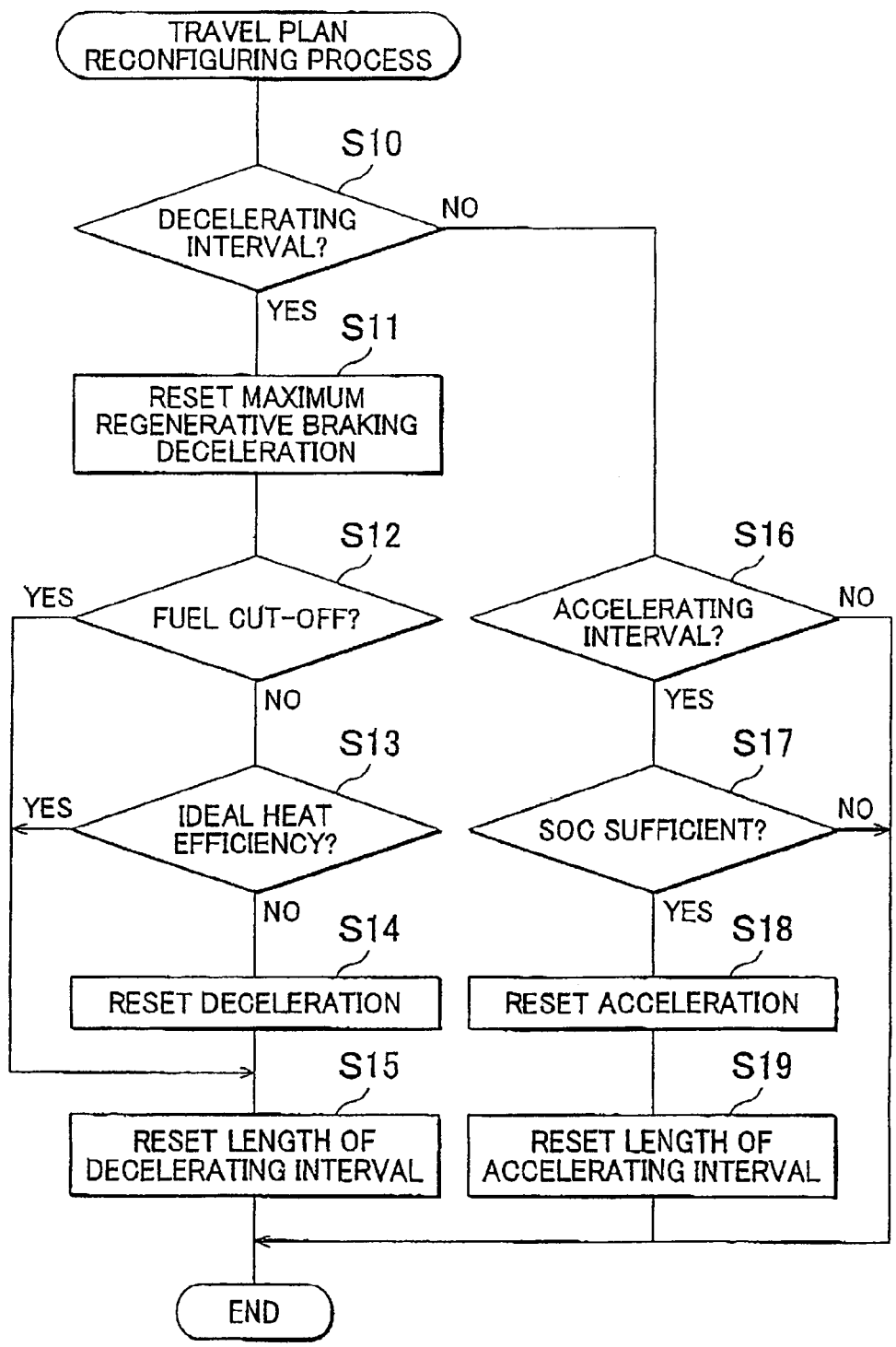
FIG. 3 is a flowchart for demonstrating operation of travel plan reconfiguration process by the ECU.

Next, the travel plan reconfiguring process in step S4 will be described with reference to FIG. 3.

The ECU 30 first determines whether or not the interval is the decelerating interval (step S10). If it is determined that the interval is not the decelerating interval (step S10: NO), the ECU 30 goes to step S16 described later.

On the other hand, if it is determined that the interval is the decelerating interval (step S10: YES), the ECU 30 resets the target deceleration in the decelerating interval in the initial travel plan to maximum regenerating braking deceleration at which the maximum regenerative braking is made (step S11). The maximum regenerative braking deceleration is the deceleration at which regeneration at the input intensity limit of the battery and is, for example, deceleration of −0.2 G.

Next, the ECU 30 determines whether or not the engine is rotating in a fuel cut-off state (step S12). If it is determined that the engine is rotating in the fuel cut-off state (step S12: YES), the ECU 30 determines that there is no loss in heat efficiency and goes to step S15 described later.

On the other hand, it is determined that the engine is rotating not in the fuel cut-off state (step S12: NO), the ECU 30 determines whether or not the engine is rotating in an ideal heat efficiency state (for example, the engine rotation is about 2,500 rpm) (step S13). If it is determined that the engine is rotating in the ideal heat efficiency state (step S13: YES), the ECU 30 determines that the loss in heat efficiency is extremely small and goes to step S15 described later.

On the other hand, if it is determined that the engine is not rotating in the ideal heat efficiency state (step S13: NO), the ECU 30 resets the target deceleration (maximum regenerative braking deceleration) reset in step S11 to new target deceleration that is larger deceleration (step S14). In other words, the initial travel plan produced in step S1 is planned so that the engine is stopped in the decelerating interval. However, if the engine non-stop state occurs, the vehicle is decelerated at small deceleration while the engine is rotating, thus causing loss in heat efficiency. If the engine is in the engine non-stop state and not at the ideal heat efficiency, the ECU 30 resets the target deceleration to a value that a product of the maximum regenerative braking deceleration set in step S11 and the ideal heat efficiency of the engine is divided by the heat efficiency and the charge-discharge efficiency of the battery at the current engine speed as expressed by an equation (1), in order to convert the loss into large braking force of the hydraulic brake. The charge efficiency of the battery is, for example, $0.9^4$ (approximately 0.64).

$$\text{Target Deceleration} = (\text{Maximum Regenerative Braking Deceleration} \times \text{Ideal Heat Efficiency})/(\text{Current Heat Efficiency} \times \text{Battery Charge-Discharge Efficiency}) \quad (1)$$

Next, the ECU 30 resets the length of the decelerating interval in response to the target acceleration that is reset in step S11 or S14 (step S15). In other words, the target deceleration in the decelerating interval is reset to be larger than that in the initial travel plan produced in step S1 by the reset of the target deceleration in step S11 or S14. Therefore, the decelerating distance in the decelerating interval is made shorter than that in the initial travel plan. Accordingly, in step S15, the decelerating interval length is reset to be shorter by setting deceleration starting point later. The decelerating interval length reset in step S15 is, as expressed by an equation (2), a value that a product of the length of the decelerating interval in the initial travel plan produced in step S1 (original decelerating interval length) and the deceleration (original deceleration) is divided by the maximum regenerative braking deceleration (reset deceleration) reset in step S11 or the target deceleration (reset deceleration) reset in step S14.

Decelerating Interval Length=(Original Decelerating Interval Length×Original Deceleration)/Reset Deceleration (2)

The ECU 30 ends the travel plan reconfiguring process. Then, the ECU 30 controls travel of the vehicle based on steps S11, S14, and S15.

On the other hand, in step S10 described above, if it is determined that the interval is not the decelerating interval (step S10: NO), the ECU 30 determines whether or not the interval is an accelerating interval that follows the decelerating interval (step S16). If it is determined that the interval is not the accelerating interval that follows the decelerating interval (step S16: NO), the ECU 30 ends the travel plan reconfiguring process.

On the other hand, if it is determined that the interval is the accelerating interval that follows the decelerating interval (step S16: YES), the ECU 30 determines whether or not the SOC (State of Charge) of the battery is sufficient (step S17). In other words, it is determined that the SOC is sufficient if the SOC is a predetermined value (for example, 60%) or more. It is determined that the SOC is not sufficient if the SOC is less than the predetermined value. If it is determined that the SOC is not sufficient (step S17: NO), the ECU 30 ends the travel plan reconfiguring process.

On the other hand, if it is determined that the SOC is sufficient (step S17: YES), the ECU 30 resets the target acceleration in the accelerating interval in the initial travel plan to new target acceleration to which acceleration corresponding to the output limit of the battery (for example, 50 kW) has been added (step S18). In other words, if the deceleration in the decelerating interval is reset to be larger in step S11 or S14, the regeneration amount increases in the decelerating interval. Therefore, the SOC tends to reach an upper limit value (a state that the battery is fully charged) compared to the state before the reset. Once the SOC reaches the upper limit value, electric power is no longer regenerated. Therefore, the advantage of the hybrid vehicle cannot be obtained. As a result, fuel efficiency for the whole trip deteriorates. Therefore, when the interval is the accelerating interval that follows the decelerating interval, and the SOC is sufficient, the ECU 30 resets the target acceleration in the accelerating interval to a value that the acceleration corresponding to the output limit of the battery is added to the target acceleration (original acceleration) in the initial travel plan produced in step S1 as expressed by an equation (3). The motor is driven at the output limit of the battery to accelerate the vehicle. Accordingly, the SOC is reduced, and an accelerating period is shortened at the larger target acceleration.

Target acceleration=Original Target Acceleration+ Acceleration Corresponding to Output Limit of Battery (3)

The ECU 30 ends the travel plan reconfiguring process. Then, the ECU 30 controls travel of the vehicle based on the travel plan reconfigured in the travel plan reconfiguring process described above.

Figure 4A:
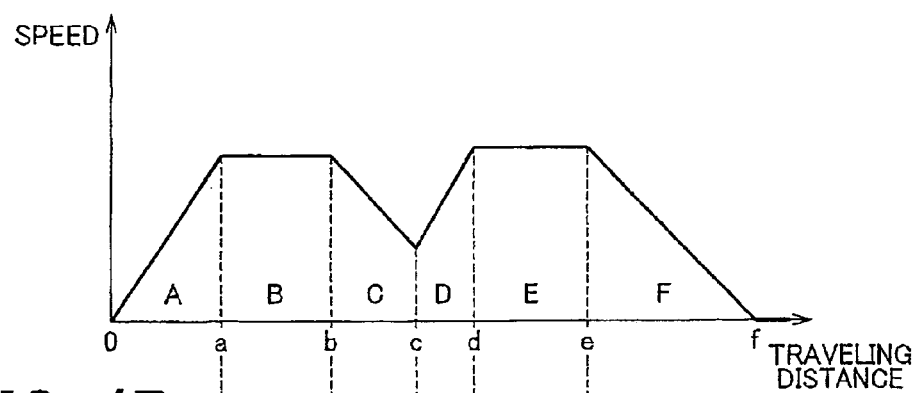
FIGS. 4A and 4B are graphs indicating relationships between speed and travel distance.
Figure 4B:
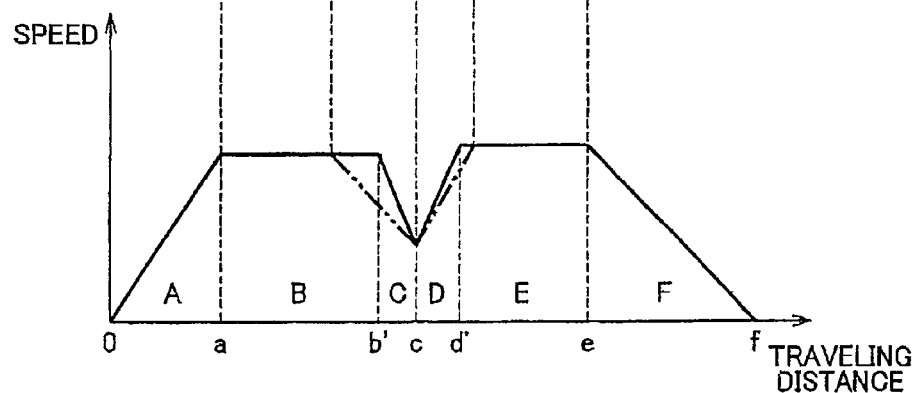

Next, descriptions will be made on an example of the speed patterns of the travel plan produced by the vehicle travel control system 1 with reference to FIG. 4. FIG. 4 is a graph indicating the relationship between speed and travel distance. FIG. 4A represents the initial travel plan. FIG. 4B represents the reconfigured travel plan.

As shown in FIG. 4A, the initial travel plan produced in the initial travel plan producing process (step S1) is a travel plan that the vehicle travels from a point (0) to a point (f) in a predetermined time. Specifically, in the initial travel plan, the interval from the point (0) to a point (a) is an accelerating interval (A), the interval from the point (a) to a point (b) is a constant speed travel interval (B), the interval from the point (b) to a point (c) is a decelerating interval (C) in which the vehicle is decelerated by the engine stop, the interval from the point (c) to a point (d) is an accelerating interval (D), the interval from the point (d) to a point (e) is a constant speed travel interval (E), and the interval from the point (e) to the point (f) is a decelerating interval (F).

If the non-stop state of the engine occurs when the vehicle travels based on the initial travel plan, as shown in FIG. 4B, the decelerating interval (C) is reconfigured so that the deceleration becomes larger and that the decelerating interval length becomes shorter in the travel plan reconfiguring process (step S4). In other words, the constant speed travel interval (B) is reconfigured to the interval from the point (a) to a point (b') (a point subsequent to the point (b)). The decelerating interval (C) is reconfigured to the interval from the point (b') to the point (c). The accelerating interval (D) that follows the decelerating interval (C) is reconfigured such that the acceleration becomes larger and that the accelerating interval length becomes shorter. In other words, the accelerating interval (D) is reconfigured to the interval from the point (c) to a point (d') (a point subsequent to the point (d)). The constant speed travel interval (E) is reconfigured to the interval from the point (d') to the point (e).

As described above, in accordance with the first embodiment, the initial travel plan producing section 31 produces the initial travel plan including the decelerating interval in which the engine is stopped to decelerate the vehicle. This allows improvement in fuel efficiency. If the non-stop state of the engine occurs while the vehicle is traveling, the travel plan reconfiguring section 32 reconfigures the initial travel plan such that the target deceleration in the decelerating interval is set larger than that in the initial travel plan. Therefore, the average speed in the decelerating interval is improved, thereby reducing the time required for deceleration. This allows prevention of a decline in heat efficiency of the engine that can be caused by continued deceleration for a long time period. Further more, in the case that the travel time or the average speed is fixed in the travel plan, the surplus time that is provided as a result of the time reduction in the decelerating interval can be assigned to the other intervals. Therefore, low fuel consumption can be realized for the whole travel plan. As described above, the vehicle travel control system 1 allows prevention of deterioration in fuel efficiency even when the non-stop state of the engine occurs in the case that travel of the vehicle is controlled based on the travel plan in which the vehicle is decelerated by the engine stop.

In accordance with the first embodiment, when the non-stop state of the engine occurs, the travel plan reconfiguring section 32 reconfigures the initial travel plan such that the target acceleration in the accelerating interval that follows the decelerating interval is set larger. Therefore, the average speed in the accelerating interval is increased; thereby reducing the travel time in the accelerating interval. Accordingly, in the case that the travel time or the average speed is fixed in the travel plan, surplus time that is provided as a result of the time reduction in the accelerating interval can be assigned distributed to the other intervals. Therefore, low fuel consumption can be realized for the whole travel plan.

In accordance with the first embodiment, the value that the product of the maximum regenerative braking deceleration and the ideal heat efficiency is divided by the heat efficiency and the charge-discharge efficiency of the battery at the present time is set as the target deceleration in the decelerating interval in which the internal combustion engine is brought into the non-stop state. Therefore, the deceleration in the decelerating interval is increased. In other words, the loss in the heat efficiency of the engine due to the deceleration is converted into large braking force by the hydraulic brake, and thus the average speed in the decelerating interval is increased. Accordingly, the travel time in the decelerating interval can be reduced. This allows further prevention of deterioration in fuel efficiency.

When the deceleration in the decelerating interval is increased as described above, the regeneration amount that is fed back to the battery increases. Thus, the battery can easily be fully charged. Therefore, the value that the acceleration corresponding to the output limit of the battery is added to the target acceleration produced by the initial travel plan producing section 31 is set as the target acceleration in the accelerating interval that follows the decelerating interval in which the internal combustion engine is brought into the non-stop state. This can prevent a situation that regeneration is not conducted since the battery is fully charged. Accordingly, the feedback of the regenerative electric power to the battery is effectively made to allow further improvement in fuel efficiency.

Next, a second embodiment will be described. The second embodiment has the same construction as the vehicle travel control system 1 in accordance with the first embodiment. The second embodiment differs from the first embodiment only in the initial travel plan producing process by the initial travel plan producing section 31 of the ECU 30. In other words, the initial travel plan producing section 31 estimates an interval (point) that the non-stop state of the engine occurs before producing the initial travel plan and produces the initial travel plan based on the estimation. Therefore, descriptions will hereinafter be made only on, operation of the initial travel plan producing process by the ECU 30. The initial travel plan producing process corresponds to step S1 in FIG. 2.

FIG. 5 is a flowchart for demonstrating the operation of the initial travel plan producing process by the ECU. As shown in FIG. 5, the ECU 30 first obtains a set temperature that the driver sets on a heater and so forth when the engine is started (or within a predetermined time after the engine start) (step S20). If the driver does not set the temperature in step S20, the set temperature is estimated by various kinds of estimation methods. For example, the ECU 30 may learn in advance the temperature setting operation by the driver. The set temperature may be estimated based on the learned result. If the ECU 30 cannot learn the temperature setting operation by the driver, or if the driver hardly changes the set temperature (once or less in several trips), the set temperature may be a temperature that is estimated at the current time. The estimated set temperature may be an average set temperature for a predetermined time (for example, 10 minutes) after the engine starts in each trip.

Next, in order to set an engine warm-up time, the ECU 30 first determines whether or not the coolant temperature of the vehicle is low (step S21). In step S21, it is determined that the coolant temperature is not low if a predetermined time has not passed since the last time that an ignition switch was turned off, and if the coolant temperature is a predetermined temperature (for example, 50° C.) or higher. On the other hand, it is determined that the coolant temperature is low if the predetermined time has passed since the last time that the ignition switch was turned off, and if the coolant temperature is lower than the predetermined temperature.

If it is determined that the coolant temperature is not low (step S21: NO), the ECU 30 determines that warm-up of the engine is not required, and sets the engine warm-up time to zero (step S22).

On the other hand, if it is determined that the coolant temperature is low (step S21: YES), the ECU 30 calculates the engine warm-up time based on the coolant temperature and sets the engine warm-up time (step S23). In this case, the engine warm-up time is a value which is a product of a value that the coolant temperature is subtracted from, for example, 50° C. and a predetermined coefficient (for example, 10).

When the engine warm-up time is set, the ECU 30 first determines whether or not the temperature set in the step S20 is a blow air temperature or higher in order to set the warm-up time for the heater (step S24).

If it is determined that the set temperature is the blow air temperature or higher (step S24: YES), the ECU 30 determines that warm-up of the heater is not required and sets the warm-up time to zero (step S25).

On the other hand, if it is determined that the set temperature is lower than the blow air temperature (step S24: NO), the ECU 30 computes the warm-up time for the heater based on the blow air temperature and sets the warm-up time (step S26). In this case, the warm-up time is a value which is a product of a value that the blow air temperature is subtracted from the set temperature and a predetermined coefficient (for example, 10).

Next, the ECU 30 sets an estimated warm-up time (step S27). In other words, in step S27, a comparison is made between the engine warm-up time set in step S22 or S23 and the warm-up time for the heater set in step S25 or S26. The longer warm-up time is selected from the warm-up times. The selected warm-up time is set as the estimated warm-up time.

Figure 6:
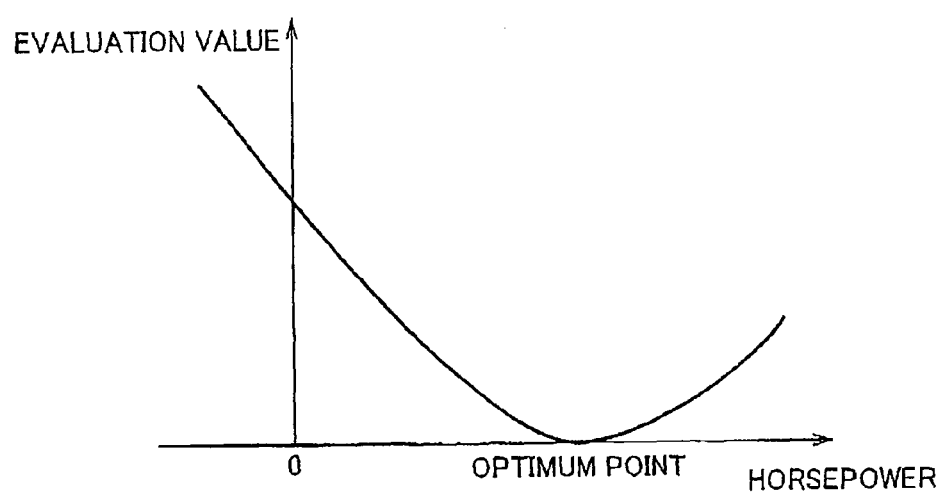
FIG. 6 is a graph indicating the relationship between evaluation value and horsepower.

Next, the ECU 30 sets a constraint condition and an evaluation equation to produce the travel plan by optimization process in consideration of the estimated warm-up time (step S28). In other words, the setting of the constraint condition and the evaluating equation is made by any of the methods described in Japanese Patent Application No. 2007-285451, Japanese Patent Application No. 2007-285458, Japanese Patent Application No. 2007-285461, Japanese Patent Application No. 2007-285462, and so forth (described above). However, the interval corresponding to the estimated warm-up time set in step S27 is treated as another interval. A heat efficiency preferential evaluation equation for the engine non-stop state is used. The heat efficiency preferential evaluation equation is an evaluation equation that a traveling state at zero engine speed is not preferred (expressed by a large number). In step S28, for example, as shown in FIG. 6, the travel plan is produced by convergence calculation on the travel track so that the evaluation value of the heat efficiency preferential evaluation equation approaches zero that is an optimum point.

The ECU 30 produces the initial travel plan by the optimization process with use of the constraint condition and the evaluation equation that are set in step S28 (step S29).

Figure 7A:
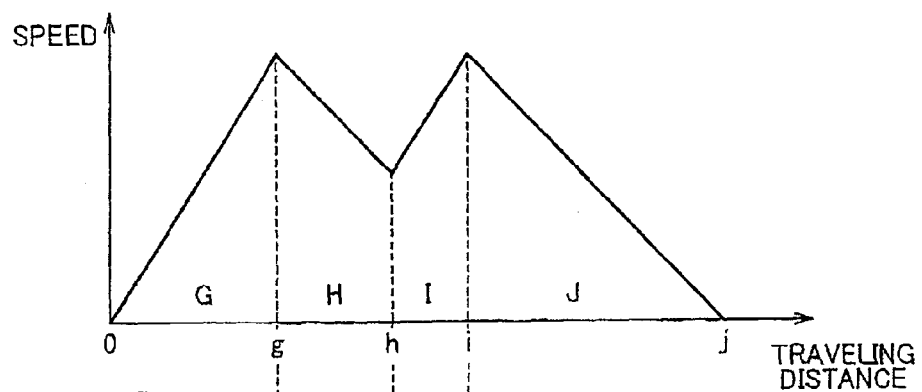
FIGS. 7A and 7B are graphs indicating the relationships between speed and travel distance.
Figure 7B:
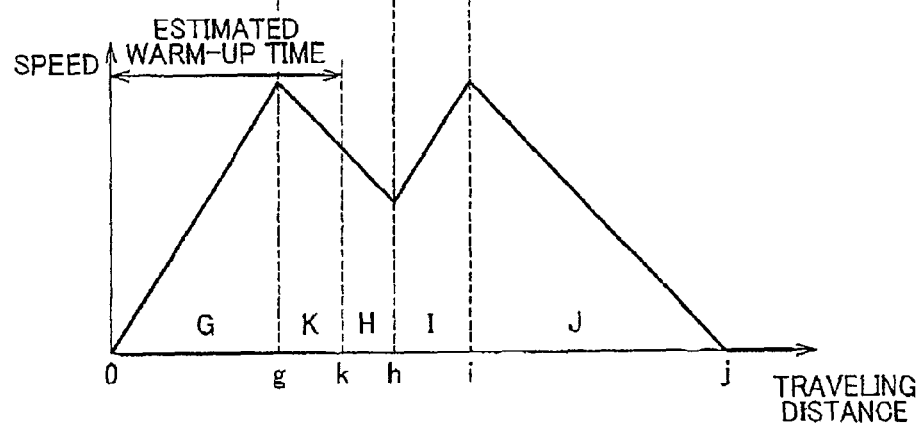

Next, descriptions will be made on an example of the speed patterns of the travel plan produced in the second embodiment with reference to FIG. 7. FIG. 7 is a graph indicating the relationship between speed and travel distance. FIG. 7A represents the normal initial travel plan. FIG. 7B represents the initial travel plan produced in the second embodiment.

As shown in FIG. 7A, the normal travel plan is a travel plan that the vehicle travels from a point (0) to a point (j) in a predetermined time. Specifically, in the initial travel plan, the interval from the point (0) to a point (g) is an accelerating interval (G), the interval from the point (g) to a point (h) is a decelerating interval (H) in which the vehicle is decelerated by the engine stop, the interval from the point (h) to a point (i) is an accelerating interval (I), and the interval from the point (i) to the point (j) is a decelerating interval (J) in which the vehicle is decelerated by the engine stop.

Meanwhile, in the second embodiment, if the time that the vehicle reaches a point (k) (a point between the points (g) and (h)) from the point (0) is set as the estimated warm-up time, the initial travel plan shown in FIG. 7B is produced by the initial travel plan producing process (step S29). In other words, in the initial travel plan produced by the initial travel plan producing process (step S29), the interval from the point (0) to the point (g) is the accelerating interval (G), the interval from the point (g) to the point (k) is a decelerating interval (K) in which the engine is not stopped, the interval from the point (k) to the point (h) is the decelerating interval (H) in which the vehicle is decelerated by the engine stop, the interval from the point (h) to the point (i) is the accelerating interval (I), and the interval from the point (i) to the point (j) is the decelerating interval (J) in which the vehicle is decelerated by the engine stop.

As described above, in accordance with the second embodiment, the estimated warm-up time in which the engine is bought into the (non-stop) state is predicted, and the initial travel plan is produced on the basis of the estimated warm-up time. Therefore, a general optimum plan that the initial travel plan is optimized as a whole can be obtained.

Figure 8:
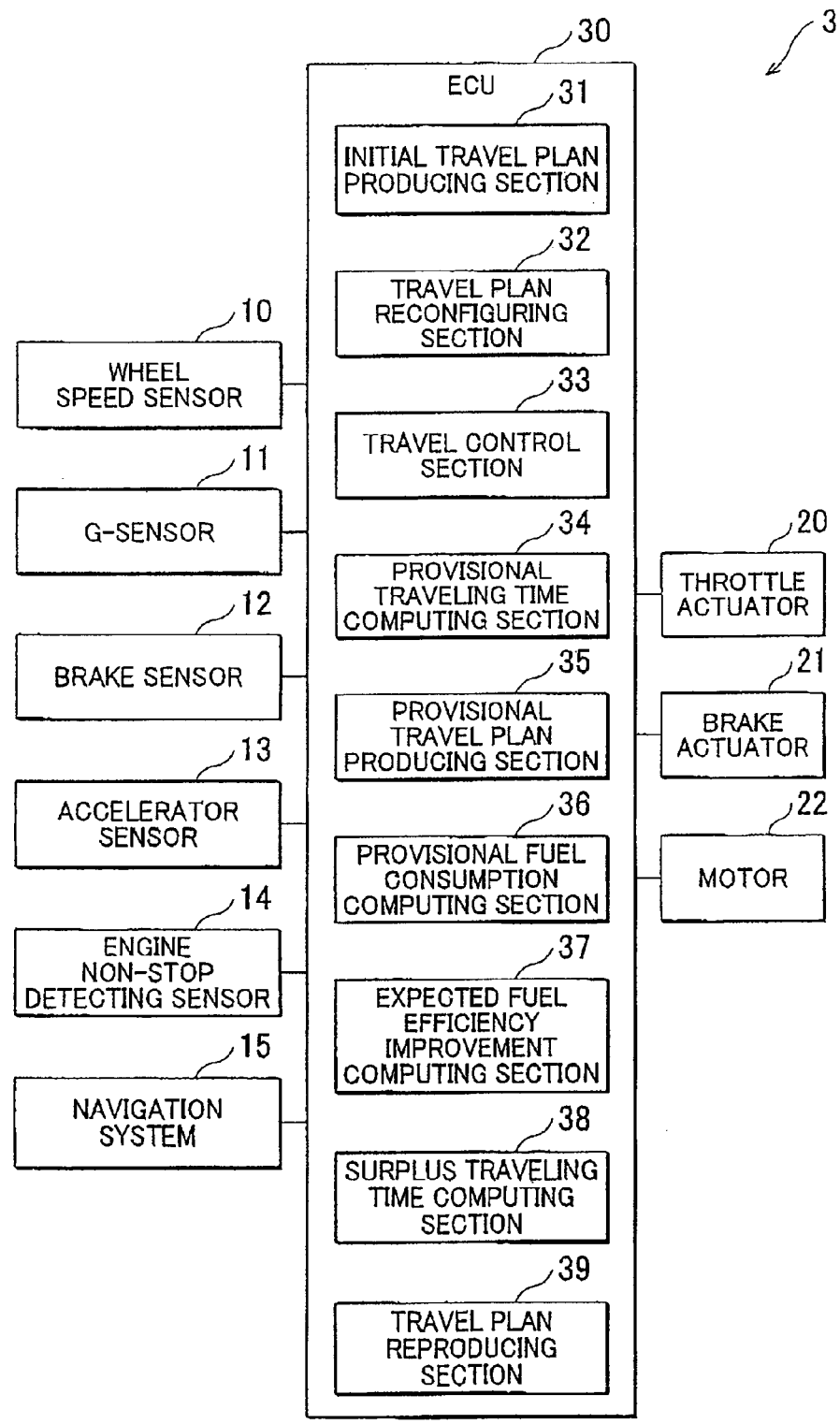
FIG. 8 is a diagram showing a construction of a vehicle travel control system in accordance with a third embodiment.

Next, a third embodiment will be described. FIG. 8 is a diagram showing a construction of a vehicle travel control system in accordance with the third embodiment. As shown in FIG. 8, the ECU 30 of a vehicle travel control system 3 in accordance with the third embodiment further functions as a provisional traveling time computing section 34, a provisional travel plan producing section 35, a provisional fuel consumption computing section 36, and an expected fuel efficiency improvement computing section 37, a surplus traveling time computing section 38, and a travel plan reproducing section 39.

The provisional traveling time computing section 34 computes a provisional traveling time that a predetermined time is added to the traveling time in each of the intervals in the initial travel plan produced by the initial travel plan producing section 31.

The provisional travel plan producing section 35 produces a provisional travel plan by the optimization process under the constraint condition that is the provisional traveling time for each of the intervals that is computed by the pfovisional traveling time computing section 34. The method to produce the provisional travel plan is the same as the method to produce the initial travel plan in the initial travel plan producing section 31.

The provisional fuel consumption computing section 36 computes the provisional fuel consumption for each of the intervals in the provisional travel plan with use of a general simulation of fuel consumption.

The expected fuel efficiency improvement computing section 37 computes the expected fuel efficiency improvement of the provisional travel plan with respect to the initial travel plan. The expected fuel efficiency improvement may be computed by any method; however, it may be computed by subtracting the provisional fuel consumption of the provisional travel plan from the fuel consumption of the initial travel plan for each of the intervals, for example. The expected fuel efficiency improvement computing section 37 may compute the expected fuel efficiency improvement ratio of the provisional fuel consumption of the provisional travel plan with respect to the fuel consumption of the initial travel plan instead of the expected fuel efficiency improvement. In other words, the expected fuel efficiency improvement ratio of the provisional fuel consumption in the provisional travel plan with respect to the fuel consumption of the initial travel plan is computed to substantially obtain the expected fuel efficiency improvement. Then, the expected fuel efficiency improvement ratio per time can be computed by dividing the fuel consumption of the initial travel plan by the provisional fuel consumption of the provisional travel plan.

The surplus traveling time computing section 38 subtracts the traveling time in the travel plan, which is reconfigured by the travel plan reconfiguring section 32, from the traveling time in the initial travel plan, which is produced by the initial travel plan producing section 31 for each of the intervals, to compute the surplus traveling time. The surplus traveling time may be computed only for the interval that is reconfigured by the travel plan reconfiguring section 32. However, the surplus traveling time may be computed for all the intervals.

The travel plan reproducing section 39 reproduces a travel plan based on the expected fuel efficiency improvement that is computed by the expected fuel efficiency improvement computing section 37 and the surplus traveling time that is computed by the surplus traveling time computing section 38. In other words, the travel plan reproducing section 39 computes the traveling time that is the surplus traveling time added with the traveling time of the interval in which the expected fuel efficiency improvement is the largest as the surplus traveling time. The travel plan reproducing section 39 reproduces a travel plan by an optimizing method with the surplus traveling time as a constraint condition.

Figure 9:
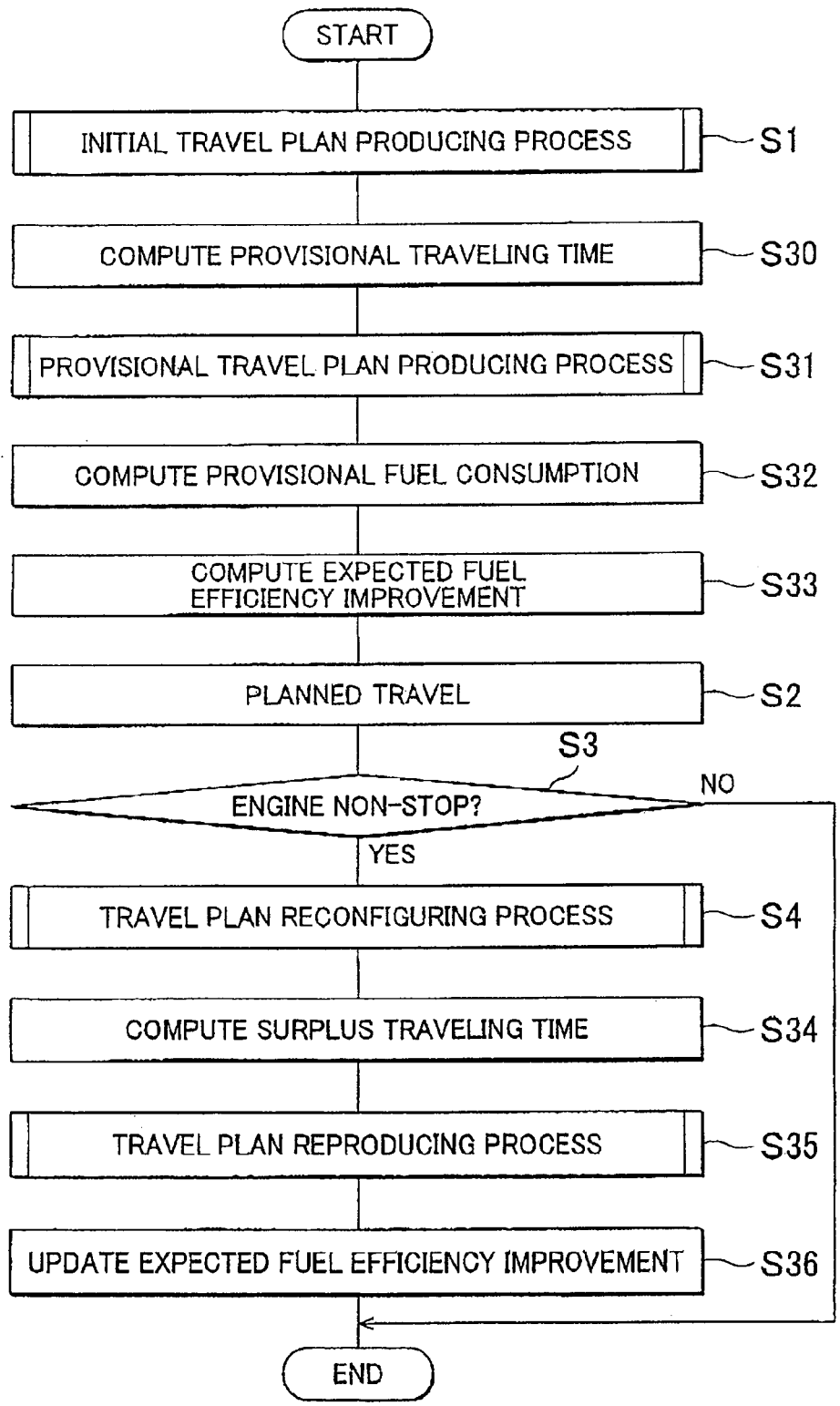
FIG. 9 is a flowchart for demonstrating processing operation by the ECU.

FIG. 9 is a flowchart for demonstrating the process operation by the ECU. As shown in FIG. 9, the ECU 30 first executes the initial travel plan producing process and produces the initial travel plan similarly to the first embodiment (step S1). In step S1, the traveling time for each of the intervals is given as an evaluation equation. The initial travel plan is produced so that a short time can be obtained under a certain condition.

Next, the ECU 30 computes the provisional traveling time that is the predetermined time added with the traveling time for each of the intervals in the initial traveling plan (step S30).

Next, the ECU 30 produces the provisional travel plan by optimization process with the provisional traveling time for each of the intervals as the constraint condition (step S31).

Next, the ECU 30 computes the provisional fuel consumption for each of the intervals in the provisional travel plan that is produced in step S31 (step S32).

Next, the ECU 30 computes the expected fuel efficiency improvement of the provisional travel plan with respect to the initial travel plan (step S33). The expected fuel efficiency improvement is computed in a manner that a value that the provisional fuel consumption of the provisional travel plan is subtracted from the fuel consumption of the initial travel plan is the expected improvement in each of the intervals.

The ECU 30 makes the vehicle travel based on the travel plan (step S2).

Thereafter, the ECU 30 determines whether or not the engine is in the non-stop state (step S3). If it is determined that the engine is not in the non-stop state (step S3: NO), the ECU 30 controls travel of the vehicle based on the initial travel plan that is produced in step S1.

On the other hand, if it is determined that the engine is in the non-stop state (step S3: YES), the ECU 30 executes an initial travel plan reconfiguring process and reconfigures the initial travel plan produced in step S1 (step S4).

After reconfiguring the initial travel plan, the ECU 30 subtracts the traveling time for each of the intervals in the travel plan reconfigured in step S4 from the traveling time for each of the intervals in the initial travel plan produced in step S1 in order to compute the surplus traveling time (step S34).

Next, the ECU 30 reproduces a travel plan based on the expected fuel efficiency improvement and the surplus traveling time (step S35). In other words, the ECU 30 selects the interval with the highest expected fuel efficiency (the interval that the expected fuel efficiency improvement ratio is the highest if the expected fuel efficiency improvement ratio is used instead of the expected fuel efficiency improvement) as a fuel efficiency improvement interval. The ECU 30 sets the traveling time that the surplus traveling time computed in step S33 is added to the traveling time for the fuel efficiency improvement interval in the travel plan produced in step S1 as an improvement traveling time for the fuel efficiency improvement interval. The ECU 30 reproduces a travel plan by the optimizing method with the improved traveling time for the fuel efficiency improvement interval as the constraint condition.

Next, the ECU 30 updates the expected fuel efficiency improvement that is computed in step S33 based on the travel plan reproduced in step S35 (step S36). The expected fuel efficiency improvement to be updated can be computed by executing steps S30 through S33 described above for the reproduced travel plan.

When the initial travel plan is reconfigured in step S35, the ECU 30 controls travel of the vehicle based on the reconfigured travel plan.

Figure 10A:
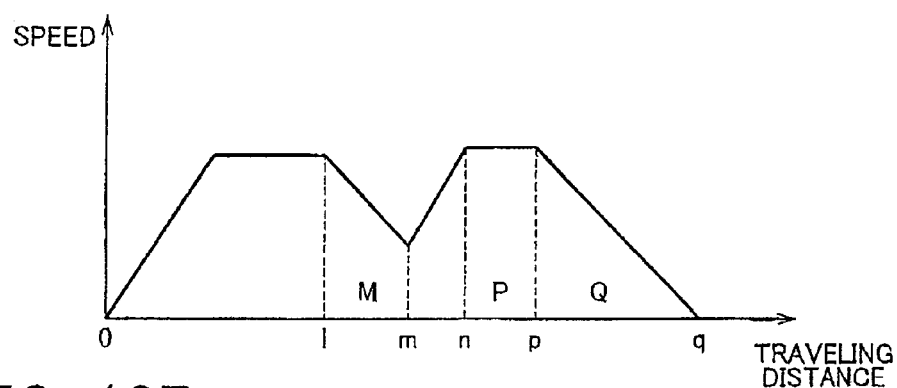
FIGS. 10A and 10B are graphs indicating the relationships between speed and travel distance.
Figure 10B:
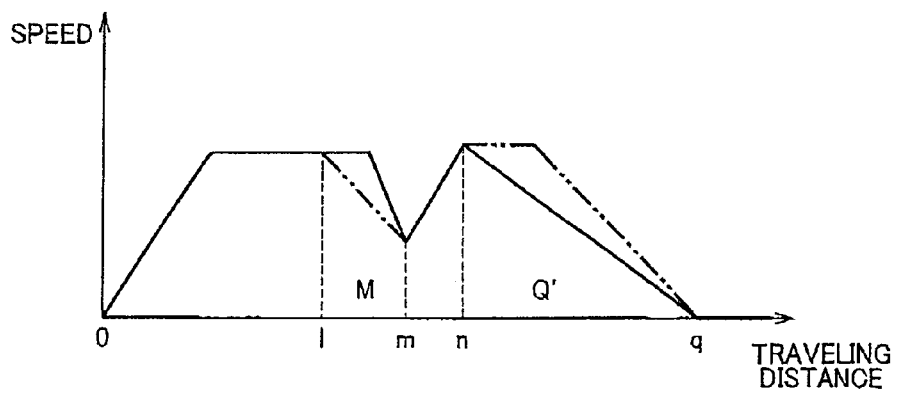

Next, descriptions will be made on an example of the speed patterns in the travel plan produced by the vehicle travel control system in accordance with the third embodiment with reference to FIG. 10. FIG. 10 is a graph indicating the relationship between speed and travel distance. FIG. 10A represents the initial travel plan. FIG. 10B represents the reconfigured travel plan.

As shown in FIG. 10A, in the initial travel plan, the interval from a point (l) to a point (m) is a decelerating interval (M) in which the vehicle is decelerated by the engine stop, the interval from a point (n) to a point (p) is a constant speed travel interval (P), and the interval from the point (p) to a point (q) is a decelerating interval (Q).

When the decelerating interval (M) is reconfigured in the travel plan reconfiguring process (step S4), and the travel plan reproducing process (step S35) is executed, the travel plan shown in FIG. 10B is produced. In other words, if the non-stop state occurs in the decelerating interval (M), the speed pattern is reconfigured to the pattern corresponding to the engine non-stop state in the decelerating interval (M). Therefore, the surplus traveling time is produced in the decelerating interval (M). Accordingly, a travel plan is reproduced by assigning the surplus time to, for example, the constant speed travel interval (P) and the decelerating interval (Q), and thereby so that the interval from the point (n) to the point (q) becomes a decelerating interval (Q') in which the vehicle is decelerated by the engine stop.

As described above, in the vehicle travel control system 3 in accordance with the third embodiment, the provisional traveling time for each of the intervals in the initial travel plan is computed, the provisional travel plan in which the provisional traveling time is the constraint condition is produced, the provisional fuel consumption for each of the intervals in the provisional travel plan is computed, and the expected fuel efficiency improvement of the provisional travel plan with respect to the initial travel plan is computed. When the first travel plan reconfiguring section reconfigures the initial travel plan, the surplus traveling time is computed from the traveling time for each of the intervals in the reconfigured travel plan, and the travel plan is reproduced by the optimization process with the constraint condition being the traveling time that the surplus traveling time is added to the traveling time for the interval with the highest expected fuel efficiency. As described above, in accordance with the vehicle travel control system, when the engine non-stop state occurs while the vehicle is traveling, the surplus traveling time for the interval reconfigured by the first travel plan reconfiguring section is assigned to the other intervals to reproduce the travel plan. Therefore, low fuel consumption can be realized for the whole travel plan. Furthermore, the travel plan can be reproduced quickly and easily.

Next, a fourth embodiment will be described. The fourth embodiment has the same construction as the vehicle travel control system 1 in accordance with the first embodiment. The fourth embodiment differs from the first embodiment only in the reconfiguring process of the travel plan in the travel plan reconfiguring section 32 of the ECU 30. In other words, the travel plan reconfiguring section 32 reconfigures the travel plan based on a cause of the engine (non-stop) state if the engine (non-stop) state occurs while the vehicle is traveling. Therefore, descriptions will be made hereinafter only on processing operation by the ECU 30.

Figure 11:
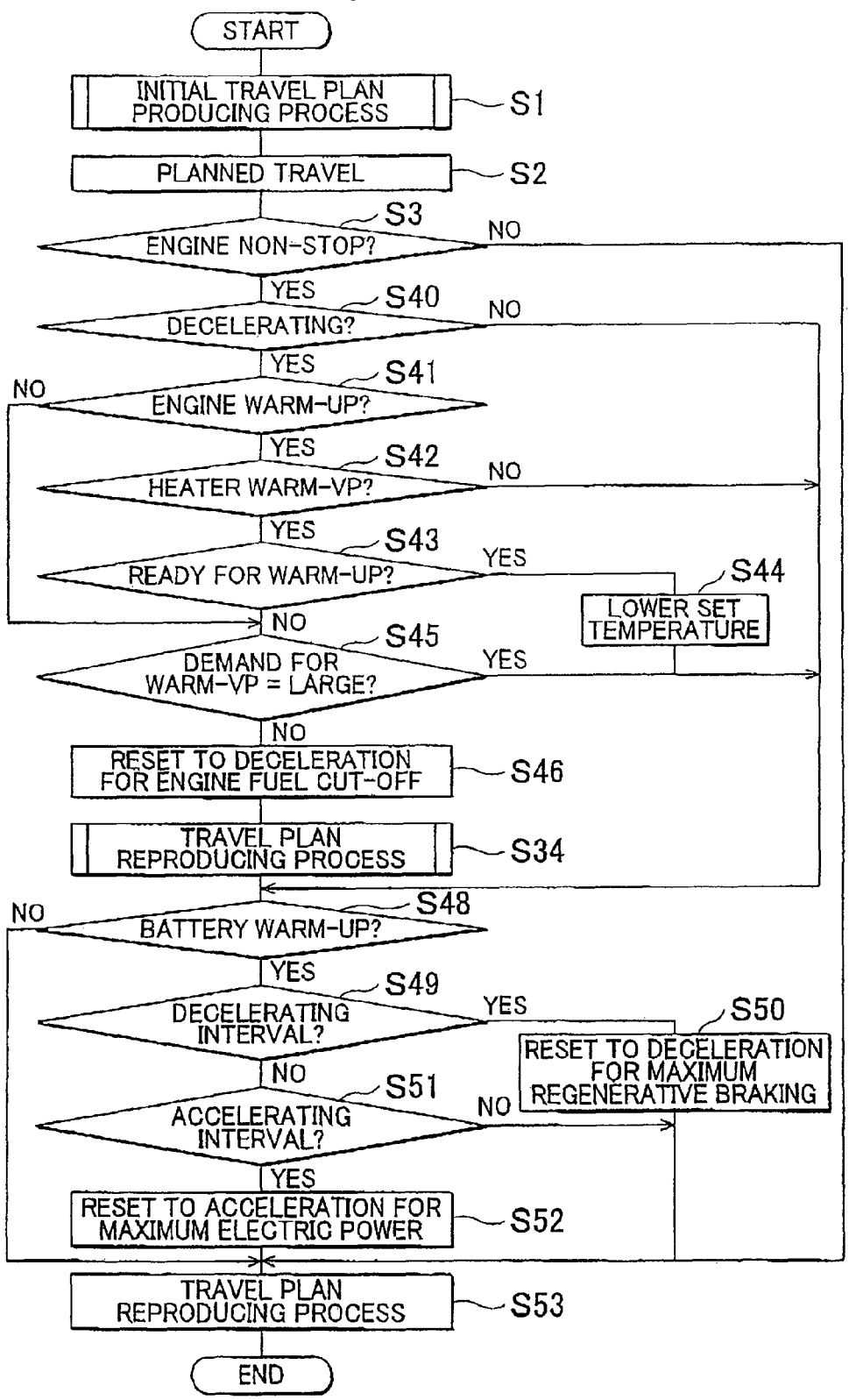
FIG. 11 is a flowchart for demonstrating processing operation by the ECU.

FIG. 11 is a flowchart for demonstrating the processing operation of the ECU. As shown in FIG. 11, the ECU 30 first executes the initial travel plan producing process and produces the initial travel plan in the same manner as in the first embodiment (step S1).

The ECU 30 makes the vehicle travel based on the travel plan (step S2).

Thereafter, the ECU 30 determines whether or not the engine is in the non-stop state (step S3). If it is determined that the engine is not in the non-stop state (step S3: NO), the ECU 30 controls travel of the vehicle based on the initial travel plan produced in step S1.

On the other hand, if it is determined that the engine is in the non-stop state (step S3: YES), the ECU 30 determines whether or not the vehicle is being decelerated (step S40). If it is determined that the vehicle is not being decelerated (step S40: NO), the ECU 30 goes to step S48 described later.

On the other hand, if it is determined that the vehicle is being decelerated (step S40: YES), the ECU 30 determines whether or not warm-up of the engine is required (step S41). The determination about whether or not warm-up of the engine is required can be made by various methods. For example, the determination may be made by the hybrid system which controls the engine and the battery. If it is determined that warm-up of the engine is not required (step S41: NO), the ECU 30 goes to step S45 described later.

On the other hand, if it is determined that warm-up of the engine is required (step S41: YES), the ECU 30 determines whether or not warm-up of the heater is required (step S42). The determination about whether or not warm-up is required can be made by various methods. Similar to step S41, for example, the determination can be made by the hybrid system. If it is determined that warm-up of the heater is not required (step S42: NO), the ECU 30 goes to step S48 described later.

On the other hand, if it is determined that warm-up of the heater is required (step S42: YES), the ECU 30 determines whether or not the vehicle interior can be warmed by blow air (step S43). In step S43, a comparison is made between the blow air temperature and the vehicle interior temperature to determine whether or not warm-up of the heater is required. If the blow air temperature is higher than the vehicle interior temperature, it is determined that the vehicle interior can be warmed by blow air. On the other hand, if the blow air temperature is equal to or lower than the vehicle interior temperature, it is determined that the vehicle interior cannot be warmed by blow air.

If it is determined that the vehicle interior can be warmed by blow air (step S43: YES), the ECU 30 temporarily lowers the set temperature of the heater (the temperature of the heater set by the driver) to the blow air temperature and stops the engine (step S44). When the ECU 30 lowers the demanded temperature to the blow air temperature and stops the engine, the ECU 30 goes to step S48 described later.

On the other hand, if it is determined that the vehicle interior cannot be warmed by blow air (step S43: NO), the ECU 30 determines whether or not warm-up is strongly demanded (step S45). The case that warm-up is strongly demanded in step S45 is, for example, a case that the coolant temperature is below 20° C. for warm-up of the engine, and a case that the temperature that the blow air temperature is subtracted from the set temperature is higher than 10° C. for warm-up of the heater. If it is determined that warm-up is strongly demanded (step S45: YES), the ECU 30 goes to step S48 described later.

On the other hand, if it is determined that warm-up is not strongly demanded (step S45: NO), the ECU 30 resets the deceleration in the decelerating interval that the vehicle is currently traveling to the deceleration that the engine is controlled in a fuel cut-off state (step S46). In other words, the deceleration is reset to the deceleration corresponding to friction loss of the engine. The friction loss of the engine is given as a performance value of the engine, and the deceleration by the friction loss is larger than the gliding deceleration.

Next, the ECU 30 determines whether or not warm-up of the battery is required (step S48). In other words, in step S48, the ECU 30 determines whether or not it is required to increase the battery temperature by charging and discharging the battery. If it is determined that warm-up of the battery is not required (step S48: NO), the ECU 30 goes to step S53 described later.

On the other hand, if it is determined that warm-up of the battery is required (step S48: YES), the ECU 30 determines whether or not the current interval that the vehicle is traveling is the decelerating interval (step S49). If it is determined that the interval is the decelerating interval (step S49: YES), the ECU 30 resets the target deceleration in the decelerating interval to the maximum regenerating braking deceleration at which the maximum regenerative braking is made (step S50). Then, the ECU 30 goes to step S53 described later.

On the other hand, if it is determined that the interval is not the decelerating interval (step S49: NO), the ECU 30 determines whether or not the current interval that the vehicle is traveling is the accelerating interval (step S51). If it is determined that the interval is not the accelerating interval (step S51: NO), the ECU 30 goes to step S53 described later.

If it is determined that the interval is the accelerating interval (step S51: YES), the ECU 30 resets the target acceleration in the accelerating interval to the acceleration at which the vehicle is accelerated with the maximum electric power (output limit of the battery) (step S52). In other words, step S52 is similar to step S13 in the first embodiment. The target acceleration is reset to a value that the acceleration corresponding to the output limit of the battery is added to the target acceleration of the initial travel plan produced in the step S1. The ECU 30 drives the motor at the maximum electric power and accelerates the vehicle.

The ECU 30 executes the travel plan reproducing process (step S53). In other words, in step S53, if the deceleration or acceleration is reset in step S46, S50, or S52, a travel plan is reproduced based on the reset deceleration or acceleration.

The travel plan reproducing process in step S53 is similar to the travel plan reproducing process in step S35 in the third embodiment. In other words, in the fourth embodiment, the processes in steps S30 through S33 (see FIG. 9) are executed before the vehicle travels. The processes in steps S34 and S35 (see FIG. 9) are executed before the travel plan reproducing process in step S53 is executed.

Figure 12:
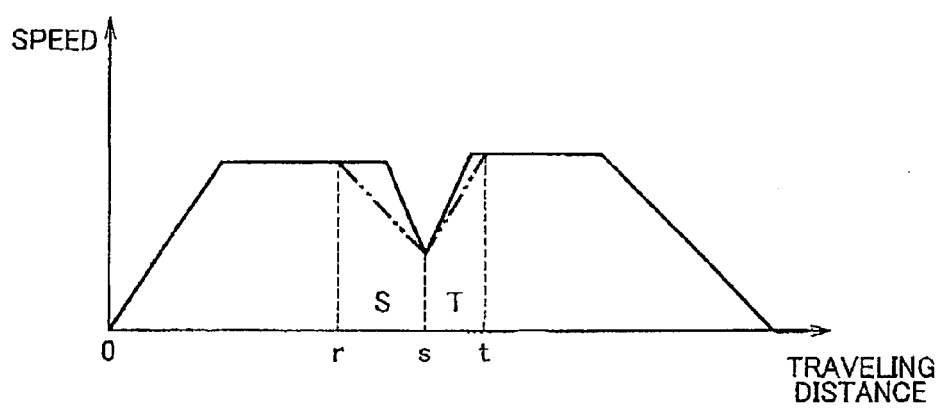
FIG. 12 is a graph indicating the relationship between speed and travel distance.

Next, descriptions will be made on an example of the speed patterns in the travel plan produced in the fourth embodiment with reference to FIG. 12. FIG. 12 is a graph indicating the relationship between speed and travel distance. In FIG. 12, the two-dot chain line represents the initial travel plan. The solid line represents the reproduced travel plan.

As shown in FIG. 12, in the initial travel plan, the interval from a point (r) to a point (s) is a decelerating interval (S) in which the vehicle is decelerated by the engine stop, and the interval from the point (s) to a point (t) is an accelerating interval (T).

If the non-stop state occurs for warm-up of the engine in the decelerating interval (S), the speed pattern is reconfigured to a pattern that the deceleration is increased by fuel cut-off. If warm-up of the battery is required, the speed pattern is reconfigured to a pattern that the acceleration is increased with the maximum electric power in the accelerating interval (T) that follows the decelerating interval (S).

As described above, in accordance with the fourth embodiment, the initial travel plan can be reconfigured in response to a cause of the non-stop state of the engine. Therefore, fuel consumption can be appropriately reduced.

Particularly, when warm-up of the engine and/or that of the heater are not strongly demanded (if slightly demanded), in other words, when the divergence from a condition to satisfy the engine stop is small, the vehicle is decelerated with the engine brake by fuel cut-off to generate heat by the engine friction. In addition, travel time can be secured due to the increase deceleration.

If the battery is warmed up, travel control is executed with the travel plan in which regenerative braking is emphasized in the decelerating interval and in which electric power assist is emphasized in the accelerating interval. Accordingly, the engine non-stop state can be cancelled quickly.

The embodiments of the present invention have been described in the foregoing. However, it should be understood that the present invention is not limited to the above embodiments. For example, in the above embodiments, descriptions are made on a case that the ECU 30 detects the non-stop state of the engine based on the signal from the engine non-stop state detection sensor 14. However, the ECU 30 may detect the non-stop state of the engine based on a signal from various sensors.

In the above embodiments, descriptions are made on a case that the travel plan reconfiguring section 32 resets the target deceleration and the target acceleration in the decelerating interval and the accelerating interval, respectively, in the initial travel plan. However, the travel plan reconfiguring section 32 may produces (replans) a travel plan that the target deceleration and the target acceleration to be reset are applied.

The invention claimed is:

1. A vehicle travel control system for controlling travel of a vehicle based on a travel plan, comprising:
 a controller including circuitry,
 wherein the circuitry includes:
  initial travel plan producing circuitry configured to produce an initial travel plan including a decelerating interval in which an internal combustion engine is stopped to decelerate the vehicle; and first replanning circuitry configured to replan the initial travel plan so that target deceleration in the decelerating interval is set larger than that in the initial travel plan when a non-stop state of the internal combustion engine occurs while the vehicle is traveling.

2. The vehicle travel control system according to claim 1, wherein the first replanning circuitry is configured to replan the initial travel plan so that target acceleration in an accelerating interval that follows the decelerating interval is set larger than that in the initial travel plan when the non-stop state of the internal combustion engine occurs while the vehicle is traveling.

3. The vehicle travel control system according to claim 1, wherein
a driving system of the vehicle is a hybrid system in which the vehicle is driven by the internal combustion engine and a motor having a battery as a power source, and
the first replanning circuitry is configured to replan the initial travel plan with new target deceleration in the decelerating interval which is a value that is a product of maximum regenerative braking deceleration at which deceleration produces maximum regeneration and ideal heat efficiency of the internal combustion engine divided by a product of heat efficiency of the internal combustion engine and charge-discharge efficiency of the battery at the present time.

4. The vehicle travel control system according to claim 3, wherein the first replanning circuitry is configured to replan the initial travel plan with new target acceleration which is a value that is acceleration corresponding to an output limit of the battery added to target acceleration in an accelerating interval.

5. The vehicle travel control system according to claim 1, wherein the initial travel plan producing circuitry is configured to estimate an estimated non-stop interval in which the internal combustion engine is brought into the non-stop state and produces the initial travel plan with use of a heat efficiency preferential evaluation equation for a case that the internal combustion engine is in the non-stop state.

6. The vehicle travel control system according to claim 1, wherein the circuitry further includes:
provisional traveling time computing circuitry configured to compute a provisional traveling time that is a specified time added to a traveling time for each interval in the initial travel plan;
provisional travel plan producing circuitry configured to produce a provisional travel plan by an optimization process with a constraint condition being the provisional traveling time;
provisional fuel consumption computing circuitry configured to compute fuel consumption for each interval in the provisional travel plan;
expected fuel efficiency improvement computing circuitry configured to compute an expected fuel efficiency improvement of the provisional travel plan with respect to the initial travel plan based on the fuel consumption for each of the intervals in the provisional travel plan and fuel consumption for each of the intervals in the initial travel plan;
surplus traveling time computing circuitry configured to subtract a traveling time for each interval in a travel plan replanned by the first replanning circuitry from the traveling time for each of the intervals in the initial travel plan to calculate a surplus traveling time for each of the intervals; and
second replanning circuitry configured to replan the travel plan with a constraint condition being a traveling time that the surplus traveling time is added to the traveling time for the interval that the expected fuel efficiency improvement is the largest.

7. The vehicle travel control system according to claim 6, wherein the second replanning circuitry is configured to replan the initial travel plan in response to a cause of the non-stop state of the internal combustion engine.

8. A vehicle travel control system for controlling travel of a vehicle based on a travel plan, comprising:
a controller including circuitry,
wherein the circuitry includes:
initial travel plan producing circuitry configured to estimate fuel consumption of the vehicle and produce an initial travel plan in consideration of a fuel consumption characteristic;
actual fuel consumption computing circuitry configured to compute an actual fuel consumption of the vehicle which travels based on the initial travel plan; and
travel plan reconfiguring circuitry configured to reconfigure the initial travel plan so that an expected fuel consumption becomes less than the initial travel plan if the actual fuel consumption exceeds the expected fuel consumption of the initial travel plan.

9. An ECU-implemented vehicle travel control method for controlling travel of a vehicle based on a travel plan, comprising:
producing, via the ECU, an initial travel plan including a decelerating interval in which an internal combustion engine is stopped to decelerate the vehicle; and
replanning, via the ECU, the initial travel plan so that target deceleration in the decelerating interval is set larger than that in the initial travel plan when a non-stop state of the internal combustion engine occurs while the vehicle is traveling.

10. The vehicle travel control method according to claim 9, further comprising
replanning, via the ECU, the initial travel plan so that target acceleration in an accelerating interval that follows the decelerating interval is set larger than the initial travel plan when the non-stop state of the internal combustion engine occurs while the vehicle is traveling.

11. The vehicle travel control method according to claim 9, further comprising:
calculating, via the ECU, a provisional traveling time that is a predetermined time added to a traveling time for each interval of the initial travel plan;
producing, via the ECU, a provisional travel plan by optimization process with a constraint condition being the provisional traveling time;
computing, via the ECU, fuel consumption for each interval in the provisional travel plan;
computing, via the ECU, an expected fuel efficiency improvement of the provisional travel plan with respect to the initial travel plan based on the fuel consumption for each of the intervals in the provisional travel plan and fuel consumption for each of the intervals in the initial travel plan;
subtracting, via the ECU, a traveling time for each interval in a replanned travel plan from the traveling time for each of the intervals in the initial travel plan to compute a surplus traveling time for each of the intervals; and
further replanning, via the ECU, the travel plan with a constraint condition being a traveling time that the surplus traveling time is added to the traveling time for the interval that the expected fuel efficiency improvement is the largest.

12. The vehicle travel control system according to claim 1, wherein the non-stop state of the internal combustion engine is a state where the internal combustion engine cannot be stopped.

13. The vehicle travel control system according to claim 1, wherein the non-stop state of the internal combustion engine is a state where the internal combustion engine cannot be stopped while the vehicle is traveling.

14. The vehicle travel control system according to claim 1, wherein the non-stop state of the internal combustion engine occurs when at least one of:
the internal combustion engine requires warm-up,
a heater requires warm-up, and
a battery requires warm-up.

15. The vehicle travel control system according to claim 1, wherein the first replanning circuitry is configured to replan the initial travel plan based upon a cause of the non-stop state of the internal combustion engine.

16. The vehicle travel control system according to claim 15, wherein when the cause of the non-stop state of the internal combustion engine is that a heater requires warm-up, the first replanning circuitry is configured to reset deceleration in the deceleration interval to deceleration resulting from a fuel cut-off state of the internal combustion engine.

17. The vehicle travel control system according to claim 15, wherein when the cause of the non-stop state of the internal combustion engine is that a battery requires warm up, the first replanning circuitry is configured to determine whether or not a current travel interval that the vehicle is travelling is the decelerating interval.

18. The vehicle travel control system according to claim 17, wherein when the current travel interval that the vehicle is travelling is the deceleration interval, the first replanning circuitry is configured to reset the target deceleration in the deceleration interval to a maximum regenerating braking deceleration at which maximum regenerative braking is made.

19. The vehicle travel control system according to claim 17, wherein when the current travel interval that the vehicle is travelling is not the deceleration interval, the first replanning circuitry is configured to determine whether or not the current travel interval that the vehicle is travelling is an accelerating interval.

20. The vehicle travel control system according to claim 19, wherein when the current travel interval that the vehicle is travelling is the acceleration interval, the first replanning circuitry is configured to reset a target acceleration in the acceleration interval to an acceleration at which the vehicle is accelerated with a maximum electric power.

* * * * *